United States Patent
Guy (10) Patent No.: US 11,278,968 B2
(45) Date of Patent: Mar. 22, 2022

(54) HIGH FEED PARTING-OFF INSERT FOR NARROW-WIDTH PARTING OPERATIONS

(71) Applicant: Iscar, Ltd., Tefen (IL)

(72) Inventor: Yaakov Guy, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/856,473

(22) Filed: Apr. 23, 2020

(65) Prior Publication Data

US 2020/0246878 A1    Aug. 6, 2020

Related U.S. Application Data

(63) Continuation of application No. PCT/IL2018/051136, filed on Oct. 24, 2018.

(60) Provisional application No. 62/594,143, filed on Dec. 4, 2017.

(51) Int. Cl.
*B23B 27/04* (2006.01)
*B23B 27/16* (2006.01)

(52) U.S. Cl.
CPC .............................. *B23B 27/1603* (2013.01)

(58) Field of Classification Search
CPC . B23B 27/1603; B23B 27/143; B23B 27/045; B23B 27/04
See application file for complete search history.

(56) References Cited

U.S. PATENT DOCUMENTS

| | | | |
|---|---|---|---|
| 4,340,325 A | 7/1982 | Gowanlock | |
| 5,054,967 A | 10/1991 | Noguchi et al. | |
| 6,238,147 B1 | 5/2001 | Tägtström et al. | |
| 7,326,007 B2 | 2/2008 | Hecht | |
| 7,578,640 B2 | 8/2009 | Hecht | |
| 8,366,355 B2 * | 2/2013 | Nagaya | B23B 27/04 407/113 |
| 8,967,920 B2 | 3/2015 | Krishtul | |
| 9,259,788 B2 | 2/2016 | Malka | |
| 2005/0232712 A1 | 10/2005 | Hecht | |
| 2008/0080937 A1 | 4/2008 | Hecht | |
| 2013/0129428 A1 * | 5/2013 | Henry | B23B 27/10 407/11 |

(Continued)

OTHER PUBLICATIONS

International Search Report dated Feb. 14, 2019, issued in PCT counterpart application (No. PCT/IL2018/051136).

(Continued)

*Primary Examiner* — Alan Snyder
(74) *Attorney, Agent, or Firm* — Womble Bond Dickinson (US) LLP (57) ABSTRACT

A parting-off insert for relatively high feed includes a rake surface including a reinforced front sub-edge extending between two convex corner sub-edges. A cutting width $W_C$ is defined between distal points of the first and second convex corner sub-edges. The cutting width $W_C$ fulfills the condition: $W_C \leq 6$ mm. The front sub-edge including a minimum front sub-edge thickness $T_F$ fulfilling the condition: $T_F > 0.20$ mm.

27 Claims, 3 Drawing Sheets

(56) References Cited

U.S. PATENT DOCUMENTS

2017/0151612 A1    6/2017  Hecht et al.

OTHER PUBLICATIONS

Written Opinion dated Feb. 14, 2019, issued in PCT counterpart application (No. PCT/IL2018/051136).

* cited by examiner

HIGH FEED PARTING-OFF INSERT FOR NARROW-WIDTH PARTING OPERATIONS

RELATED APPLICATIONS

This is a Bypass Continuation of PCT/IL2018/051136, filed Oct. 24, 2018 and published as WO 2019/111240A1. Priority is claimed to U.S. Provisional Patent Application No. 62/594,143 filed Dec. 4, 2017. The contents of the aforementioned applications are incorporated by reference in their entirety.

FIELD OF THE INVENTION

The subject matter of the present application relates to a small (i.e. narrow) width parting-off insert (also referred to as "insert" hereinafter), particularly for machining steel at high feed rates, and tool comprising same.

BACKGROUND OF THE INVENTION

One type of parting-off insert is disclosed in U.S. Pat. No. 7,326,007, the disclosure of which is incorporated herein by reference. Specifically, the insert geometry, abutment surfaces, tool and pocket geometry are incorporated herein by reference.

One type of tool (i.e. parting blade) and tool holder (i.e. blade holder) is disclosed in U.S. Pat. No. 9,259,788, the disclosure of which is incorporated herein by reference. Specifically, the tool and pocket geometry thereof, as well as the tool holder, are incorporated herein by reference.

Parting-off inserts preferably have the smallest possible width (perpendicular to a cutting direction) to minimize wastage of material. In U.S. Pat. No. 7,326,007, a resilient clamping arrangement is disclosed for holding the parting-off insert. A notable advantage of such clamp-less design is the relatively narrow machining width enabled, since the insert and the tool widths do not need to accommodate a clamp shank or screw shank. Nonetheless, to prevent dislodgement of such resiliently held inserts, different solutions including screws and clamps have been suggested.

U.S. Pat. No. 7,578,640 discloses a similar insert to U.S. Pat. No. 7,326,007, with some design modifications and further including a screw clamping a rear portion of the insert to prevent dislodgement.

US 2017/0151612 discloses a similar insert to U.S. Pat. No. 7,326,007, with some design modifications and further including a clamp for clamping a rear portion of the insert to enable heavy duty machining.

It will be understood that relatively higher feed conditions are not only limited by a tool's pocket strength limitations and type (addressed in the solutions above with screws and clamps) but also by the insert itself which can fail if subjected to excessive forces for its size.

A brochure entitled "Y-axis parting" by Sandvik Coromant (with the identification reference C-1040:194 en-GB © AB Sandvik Coromant 2017) discloses a resiliently held parting-off insert in which the insert orientation has been rotated 90 degrees to allow higher feed rates. Notably, it is stated that the same inserts and adaptors are used while allowing higher feed by providing greater stability.

In an online video demonstrating the use of the Y-axis parting (entitled "Corocut QD Demo Three times higher feed rate with Y-axis parting"; located at the website address https://www.youtube.com/watch?v=BWmdsB_VUYg) superior results are provided with the same insert having a feed of 0.45 mm/rev in the rotated 90 degree rotation when compared with a feed of 0.15 mm/rev at the conventional orientation.

It is an object of the present application to provide a new and improved insert, tool and tool assembly therefor.

SUMMARY OF THE INVENTION

In accordance with a first aspect of the invention, there is provided a narrow-width parting-off insert comprising: a shank portion; a cutting portion connected to the shank portion; and a cutting edge; the cutting edge comprising a reinforced front sub-edge formed at an intersection of a rake surface and a front relief surface; a cutting width $W_C$ of the cutting edge fulfills the condition: $W_C \leq 6$ mm, and a minimum front sub-edge thickness $T_F$ of the front sub-edge fulfills the condition: $T_F > 0.20$ mm.

A top aspect ratio $R_T$ of the front sub-edge fulfills the condition $R_T = W_C/T_F < 30$.

In accordance with a second aspect of the invention, there is provided a narrow-width parting-off insert comprising: a shank portion; and a cutting portion connected to the shank portion and defining a cutting direction from the shank portion towards the cutting portion, and a rearward direction opposite to the cutting direction; the cutting portion comprising: a rake surface; a support surface comprising at least a support surface seat portion located underneath the rake surface, a downward direction being defined as directed from the rake surface towards the support surface seat portion; a front relief surface connected to the rake surface and support surface and being the forwardmost surface of the cutting portion, the front relief surface extending downwardly from the rake surface; a first side relief surface connected to the front relief surface and the rake surface, the first side relief surface extending rearwardly from the front relief surface and extending downwardly from the rake surface; a second side relief surface connected to the front relief surface and the rake surface, the first side relief surface extending rearwardly from the front relief surface and extending downwardly from the rake surface; and a cutting edge; the cutting edge comprising: a reinforced front sub-edge formed at an intersection of the rake surface and the front relief surface; a first side sub-edge formed at an intersection of the rake surface and the first side relief surface; a second sub-edge formed at an intersection of the rake surface and the second side relief surface; a first convex corner sub-edge connecting the front sub-edge and the first side sub-edge and having a first radius $R_1$; and a second convex corner sub-edge connecting the front sub-edge and the first side sub-edge and having a second radius $R_2$; the rake surface comprising a chip-former arrangement located rearward of the front sub-edge and extending downwardly or downwardly and rearwardly from the front sub-edge; a cutting width $W_C$ is defined from a first point of the first convex corner sub-edge which is distal to the second convex corner sub-edge, to a second point of the second convex corner sub-edge which is distal to the first convex corner sub-edge; a minimum front sub-edge thickness $T_F$ is defined from a forwardmost point of the front sub-edge to a closest point of an intersection of the front sub-edge and the chip-former arrangement; wherein: a top aspect ratio of the front sub-edge, $R_T = W_C/T_F$, is less than 30; the cutting width $W_C$ fulfills the condition: $W_C \leq 6$ mm; and the minimum front sub-edge thickness $T_F$ fulfills the condition: $T_F > 0.20$ mm.

It will be understood that both the first and second aspects essentially define a parting-off insert with a relatively small cutting width and a relatively large minimum front sub-edge thickness. It has been found by the present inventor that such parting-off insert provides advantages over other solutions. More particularly, the "Y-axis parting" concept described above requires a special arrangement which in turn requires a machining center capable of movement along the Y-axis to provide increased stability and achieve the high feed rates mentioned. Whereas the present invention provides an improved insert which has been found to achieve the same feed rate with a conventional tool and arrangement.

The present invention provides a higher than previously known minimum front sub-edge thickness $T_F$ for a relatively small parting-off insert. Such solution increases the minimum front sub-edge thickness $T_F$ to be greater than previously was typical to provide a specialized high feed insert which cannot normally operate at relatively low feeds, as testing has shown. It is also expected that such geometry will not be capable of machining many workpiece material types, other than steel. Due to these limitations, it is not surprising that all other small parting inserts known have a very small minimum front sub-edge thickness, since that allows machining at low and high feeds and many different materials. Nonetheless, it is believed that this specialized insert is advantageous over special equipment required to otherwise achieve higher feed rates.

The insert can comprise a further cutting portion extending from the shank portion in the rearward direction or another direction.

Larger front sub-edge thicknesses are known for larger inserts (which have larger cutting widths $W_C$). This is because the skilled person merely increases the thickness of each component proportionately and will not be concerned that the larger insert or sturdier tool will be able to withstand the forces associated with machining the larger chips at higher feeds. However, this invention has been able to provide such higher feeds for even smaller inserts. It was surprisingly found that the less sturdy tools, pockets and insert, were able to withstand the higher forces of the chips at much higher than ordinary feed rates. This of course is preferred since smaller inserts and tools are more economical. Additionally, the smaller cutting width results in less wastage of workpiece material.

Even more surprisingly, it has been found that when working at relatively higher feed rates with the relatively larger front sub-edge thickness, significantly greater tool life is achieved than working at standard feed rates with standard front sub-edge thicknesses.

In view of the above-said, the present invention can machine faster (due to higher feed rates), requires less changing of inserts (due to longer tool life) machines more pieces (also due to longer tool life) and allows use of conventional tools and machines.

According to a third aspect of the present invention, there is provided a method of grooving or parting-off comprising: moving a tool assembly having a parting insert according to any one of the previous aspects in a cutting direction to groove or part-off a workpiece; said moving includes operating at a feed rate higher, per revolution, than the minimum front sub-edge thickness $T_F$.

It will be understood that a smaller cutting width is preferred because there is less wastage of material in a parting-off operation, however there is a limit to the structural strength of an insert for high feed operations. Accordingly, it is preferred that the cutting width $W_C$ fulfills the condition: $W_C \leq 5$ mm, or even $W_C \leq 4$ mm. It will be understood that a lower limit for the cutting width $W_C$ is in accordance with desired machining parameters. In any case, a most preferred range for the cutting width $W_C$ is: 2.5 mm $\leq W_C \leq 4$ mm. Said most preferred range allows significant cutting forces while providing a narrow cut width which minimizes parting-off wastage of material. It will be understood that parting-off insert can also be used for grooving operations if desired.

Similarly, increasing a minimum front sub-edge thickness can allow greater feed rates, however this also increases the forces on the insert and there are limits to machine capabilities (speeds etc.). Accordingly, it is preferred that the minimum front sub-edge thickness $T_F$ fulfills the condition: $T_F > 0.25$ mm, $T_F > 0.30$ mm, or even $T_F > 0.35$ mm. At this stage several values have been tested and an upper limit for this concept, if there is one, has not yet been found. Generally speaking, a feed rate should be greater than the minimum front sub-edge thickness $T_F$. For example, if the minimum front sub-edge thickness $T_F$ is 0.25 mm, then a recommended feed rate would be 0.30 mm/rev or 0.35 mm/rev. If a feed rate of 0.20 mm/rev would be used with an insert having such front sub-edge thickness it would be expected that the machining would be unsuccessful. Testing thus far has indeed shown this to be an accurate assumption. Accordingly, each greater value of minimum front sub-edge thickness $T_F$ is preferred because it allows the advantages stated above, however external factors such as machine capability (speeds etc.) may limit this design feature from being even larger. Also, it is expected that machine operators will be reluctant to operate at such high feeds for fear damage or immediate failure. Nonetheless, when external factors are removed, it is believed said thickness can be increased even above the values mentioned above, with the feed rate being increased accordingly. In any case, even though values even higher are likely to be feasible, values of front sub-edge thickness $T_F$ of 0.25 mm and 0.35 mm have been successfully tested. Accordingly, a preferred yet non-limiting range is 0.20 mm $\leq T_F \leq 0.40$ mm, with an even more preferred range being 0.25 mm $\leq T_F \leq 0.35$ mm. As mentioned, it is not precluded that higher values of front sub-edge thickness $T_F$ may provide suitable results in future.

In more recent tests, it has been found that, while not optimal, feed rates exactly equaling a sub-edge thickness $T_F$ also provided surprisingly good results. For example, if a front sub-edge thickness $T_F$ is 0.25 mm, then a recommended feed rate would be 0.25 mm/rev or higher.

For parting off operations, it is preferred that the front sub-edge is straight in a plan view of the rake surface. It is noted that circular front sub-edges in parting off applications have inferior chip evacuation properties hence a straight front sub-edge is preferred. Even more preferably, the front sub-edge is perpendicular to the cutting direction, in a plan view of the rake surface. This is also due to chip evacuation considerations and/or dead center spike size considerations.

Yet another reason that comparatively large sub-edge thicknesses $T_F$ and radii R are less preferred is because a better chip shape can be achieved with the known thicknesses and radii.

According to some embodiments, it may be preferred that the front sub-edge is straight in a view of the front relief surface along the rearward direction.

According to some embodiments, it may be preferred that the front sub-edge has a uniform thickness.

It will be understood that an increased radius size is preferred for structural strength in high feed operations. However, as mentioned above, in parting-off operations there is a dead center spike left in the center of the workpiece after the operation has been performed. The larger the radius of the cutting edge, the larger the spike will be. It will be understood that a larger radius also causes the tool holding the insert to undesirably bend at the end of the parting-off operation. Nonetheless for such feed conditions, a strengthened radius is highly desirable. After testing, it has been found that the size of the spike only increases slightly with an increased radius, which allows an insert of the present invention to have a significantly greater minimum front sub-edge thickness (which does not significantly affect machining quality) and a moderately greater (i.e. sufficient) radius to maintain structural strength while not overly increasing the spike's size. While each of the first and second radii need not necessarily be identical, for succinctness both will be addressed together. Accordingly, it is preferred that the first radius $R_1$ fulfills the condition: $R_1 > 0.20$ mm; and the second radius $R_2$ fulfills the condition: $R_2 > 0.20$ mm, preferably they can fulfill the conditions $R_1 > 0.30$ mm, $R_{2>0.30}$ mm or even $R_1 > 0.35$ mm and $R_{2>0.35}$ mm. However, according to theory it is believed that a theoretical upper limit for acceptable performance would be $R_1 < 0.60$ mm and $R_2 < 0.60$ mm. Even more preferably, $R_1$ should fulfill the condition: $R_1 < 0.45$ mm and the second radius $R_2$ should fulfills the condition: $R_2 < 0.45$ mm.

Some preferred general insert geometry features will now be discussed.

Preferably, a support surface seat portion extends parallel or substantially parallel to the rake surface. It will be understood that for high feed applications, it is advantageous for the insert to be supported directly underneath the rake surface (which participates in cutting).

It is generally preferably for parting-off operations that the cutting portion's surfaces be relieved. Accordingly, each of the features below are preferred individually and/or in combination:
  the front relief surface extends downwardly and rearwardly from the rake surface;
  the first side relief surface extends rearwardly and inwardly from the front relief surface;
  the first side relief surface extends downwardly and inwardly from the rake surface;
  the second side relief surface extends rearwardly and inwardly from the front relief surface; and
  wherein the second side relief surface extends downwardly and inwardly from the rake surface.

To clarify, while the aspects above may define a direction as being, e.g., "downwardly" and the specification, e.g. the previous paragraph, may further define the same element as being e.g., "downwardly and rearwardly" it will be understood that the initial direction "downwardly" is meant generally. Such that further specification is also possible, so that the surface could also extend downwardly and rearwardly or downwardly and forwardly, as long as a downward component is still present. With regards to the front relief surface, for example, it is noted that there is a possibility that it could also be oriented downwardly and forwardly, as long as the insert's overall orientation in a pocket provides relief during a parting-off operation.

On the matter of directions, it will be understood that for the parting-off operations and/or grooving operations, a cutting direction for such inserts is well known in the field. I.e. the cutting insert is moved in a single direction into a work piece to perform such operation. For the purposes of explaining the geometry of the insert, the cutting direction also constitutes a forward direction of the insert.

The present application is generally directed to an insert for parting-off operations. It will be understood that such inserts are also suitable for grooving operations, since the difference is that grooving operations only require a comparatively smaller depth of cut (relative to the workpiece size).

Accordingly, the advantageous cutting portion arrangement discussed above could be applied to any number of different types of inserts. For example, it could be carried out on a pentagonal insert of the type disclosed in U.S. Pat. No. 9,174,279, the disclosure of which is incorporated herein by reference.

Nonetheless, the most difficult parting-off operations are those with relatively long overhangs, which significantly increase instability and chance of failure and wear. For example, the parting blade and tool assembly shown in U.S. Pat. No. 9,259,788. Long overhangs are typically machined with inserts having a single cutting edge so that the entire insert can enter the workpiece.

Accordingly, in some embodiments it is the insert only comprises a single cutting edge. It is also possible to twist inserts such that only one cutting edge can be operative and the other can be inserted in a workpiece. Accordingly, it is additionally or alternatively preferred that in a plan view of the rake surface, the cutting width $W_C$ at the cutting edge is the largest dimension of the insert perpendicular to the cutting direction.

It will also be noted that the provision of a screw hole or clamp increases the size of a cutting insert and hence either increases the cutting width thereof or reduces the cutting depth thereof. An insert according to some preferred embodiments has a solid construction (i.e. devoid of a screw hole or any hole, or even a partial arrangement to accommodate a screw or clamp).

Further to the discussion of U.S. Pat. No. 9,174,279, it will thus be understood that the insert can comprise a further cutting portion extending from the shank portion in the rearward direction or another direction, or circumferentially extending cutting portions, etc. It will also be understood, that a shank portion is defined as a portion of an insert configured to be mounted to a tool, more particularly to a pocket. Such configuration could be in the form of a screw hole, abutment surfaces, lateral securement arrangement, etc. Similarly, a cutting portion means an insert's portion configured to participate in cutting.

While it is envisaged that different chip-former arrangement may provide suitable performance. Testing has been carried out with the chip-former arrangement shown, i.e. comprising only a single recess. Thus, such arrangement, having been tested successfully, is certainly a preferred chip-former arrangement.

It will be understood that the optimal design is as small an insert as possible. According to inserts tested, it is preferred that a sintered volume of the insert having a cutting width of 5 mm or less is less than 260 mm$^3$. It will be understood that for an insert having a cutting width of 4 mm or less, it can be preferred that the sintered volume is less than 140 mm$^3$, and that for an insert having a cutting width of 3 mm or less, it can be preferred that the sintered volume is less than 100 mm$^3$.

Figure 1A:
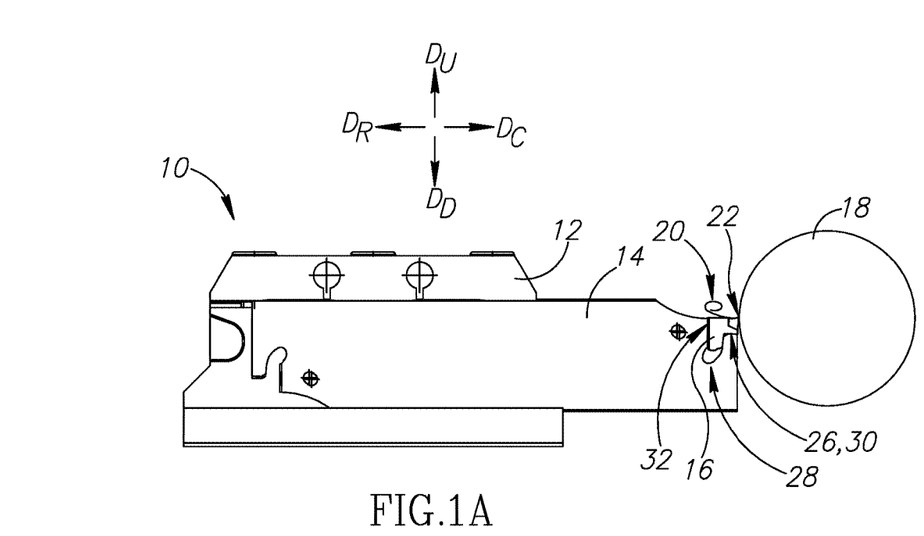
FIG. 1A is a side view of a tool assembly schematically machining a workpiece.

Finally, it is noted that a preferred insert geometry is that shown in the drawings of the present application, and also shown, for example, in U.S. Pat. Nos. 7,326,007 and 9,259,788. This insert geometry has a special advantage for the present invention's intended extraordinarily high feed rates. As shown in FIG. 1A, the exceptionally large chip 20, schematically shown, is advantageously unimpeded by a blade upper clamp or lip. It will be understood that such insert geometry and/or the tool holding the insert, only grip the insert at lower surface and not adjacent to the rake surface thereof. Accordingly, such large and fast-moving chip will not damage any upper clamp or lip of a tool during machining with exceptionally high feed conditions.

Accordingly, according to one preferred insert geometry, the insert can comprise the following features individually and/or in combination:
- a support surface can be formed with a support lateral securing arrangement; the support lateral securing arrangement can be located on the support surface seat portion; the support lateral securing arrangement can comprise a support groove extending parallel to the cutting direction and having opposing support side groove surfaces extending inwardly and upwardly;
- a rear surface of the insert can comprise a rear lateral securing arrangement; the rear lateral securing arrangement can comprise a rear groove extending orthogonal to the rake surface and having opposing rear side groove surfaces extending inwardly and forwardly;
- a support surface can comprise a support surface abutment portion extending downward from the support surface seat portion; the support surface abutment portion can extend downward and rearward; the support surface abutment portion can be devoid of a lateral securing arrangement;
- a support surface can comprise a bottom surface portion extending rearward from a support surface abutment portion to a rear surface of the insert;
- the only surfaces of the insert which have a lateral securing arrangement can be the support surface seat portion and a rear surface;
- rearward of a connection area of the shank and cutting portion, a shank portion can further extend downwardly or downwardly and rearwardly; and
- a shank portion further extends only downwardly.

While such inserts have not been known to have a coolant configuration, for the present high-feed application it is considered desirable. Especially when using high pressure coolant to assist in chip breakage. Accordingly, in some embodiments, in a plan view of the rake surface, at an upper surface of the shank portion a coolant groove can be formed and extends towards the rake surface. The coolant groove can open out to the rake surface. The coolant groove can open out to a rear surface of the insert located at a rear surface located opposite the front relief surface.

Further to the explanation above, according to a fourth aspect there is provided a tool (e.g. a parting blade) or a tool assembly (tool holder, tool and insert according to any one of the aspects above) for high feed parting-off operations.

The tool can be formed with a pocket for holding the parting-off insert. The tool can, at least underneath the pocket, have a tool thickness $T_B$, measured perpendicular to a cutting direction, which is narrower than the insert's cutting width. In some embodiments, it is preferred that the entire tool has a tool thickness $T_B$ which is narrower than the insert's cutting width.

The pocket can preferably be a resilient pocket (i.e. configured to resiliently hold an insert without a screw or clamp, thereby allowing a smaller cutting width and/or tool width).

The resilient pocket can preferably be configured to only contact a support surface and a rear surface of the insert. Stated differently, the tool can be devoid of any element extending over the tool pocket.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1B:
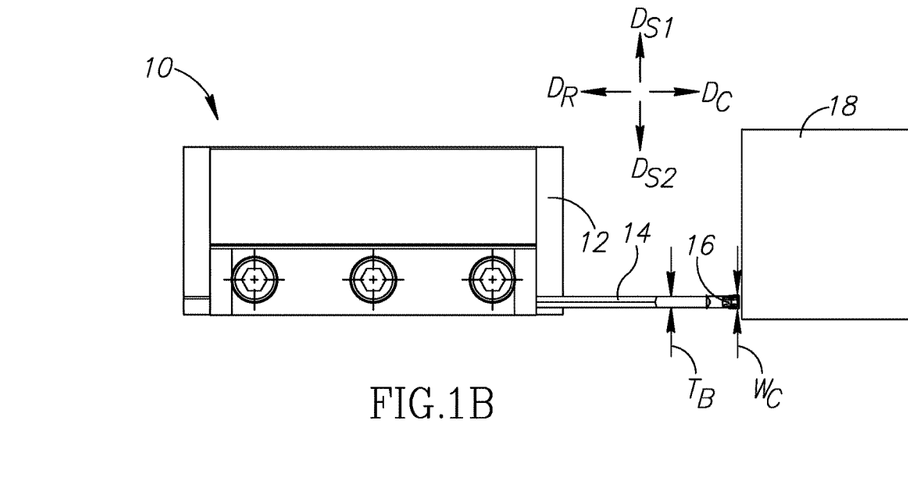
FIG. 1B is a plan view of the tool assembly and workpiece in FIG. 1A.
Figure 1C:
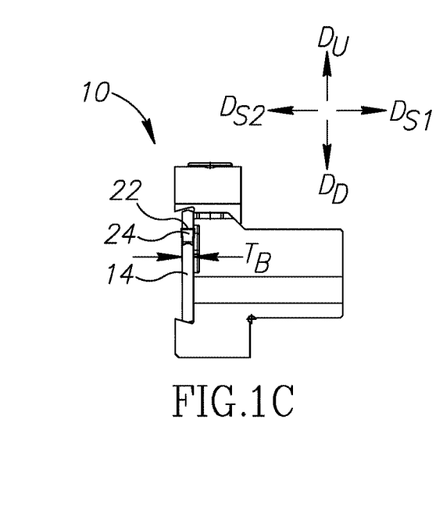
FIG. 1C is a front view (also called a front view in the rearward direction) of the tool assembly in FIG. 1A without the workpiece.

Referring to FIGS. 1A to 1C, illustrated is an exemplary tool assembly 10 comprising a tool holder 12, a tool 14, a solid parting-off insert 16, and a steel workpiece 18 being machined in FIG. 1A with a chip 20 being schematically shown.

From FIGS. 1A and 1B, it will be understood, as is known in the art, that a cutting direction $D_C$ is defined as the direction in which the insert 16 is moved into the workpiece 18. This could be alternatively defined as a direction parallel to a rake surface 22 and towards a front relief surface 24 (FIG. 1C) of the insert 16. A rearward direction $D_R$ is defined opposite to the cutting direction (or forward direction) $D_C$.

A downward direction $D_D$ is defined as directed from the rake surface 22 towards the support surface seat portion 26. An upward direction $D_R$ is defined opposite to the downward direction $D_D$.

For the sake of good order, first and second side directions $D_{S1}$, $D_{S2}$ are defined orthogonal to the cutting direction $D_C$, rearward direction $D_R$, downward direction $D_D$ and upward direction $D_R$. Although, as will be understood from the following drawings, inward or outward directions to the insert relative to the other features thereof, is more relevant to understand the geometry, and such specific names "upward", "downward" "side" are for convenience only. As is known, such tool assembly 10 can also operate upside down.

The exemplary tool assembly 10 shown, has a tool 14 which is a parting blade configured for particularly long overhangs. Accordingly, the tool 14 has a tool thickness $T_B$ which is smaller than a cutting width $W_C$ of the insert. Accordingly, the tool 14 can enter the workpiece 18 until, for example, the workpiece reaches the tool holder 12 (or stability cannot be maintained).

The tool 14 comprises a resilient pocket 28 which only contacts a support surface 30 and a rear surface 32 of the insert 16.

Referring now to FIGS. 2A to 2H, the invention will be described with reference to a preferred but non-limiting insert geometry.

The insert 16 comprises an exemplary, but not limiting, shank portion 34 and a cutting portion 36. As shown, spaced apart from the cutting portion 36, the shank portion extends downwardly, in this example only downwardly.

The insert 16 can be defined as comprising the following surfaces: a front relief surface 24, a rear surface 32 located opposite the front relief surface 24, an upper surface 38, a support surface 30 located opposite to the upper surface 38, and first and second side surfaces 40, 42 connecting the front relief surface 24, rear surface 32 upper surface 38 and support surfaces 30.

Figure 2A:
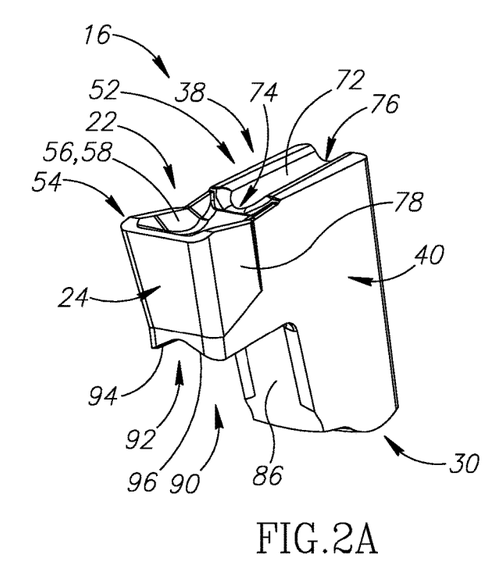
FIG. 2A is a first side perspective view of the cutting insert of the tool assembly in FIG. 1A.
Figure 2B:
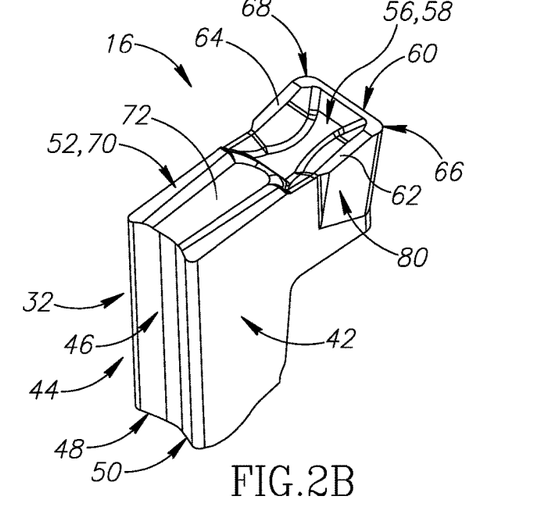
FIG. 2B is a second side perspective view of the cutting insert in FIG. 2A.
Figure 2C:
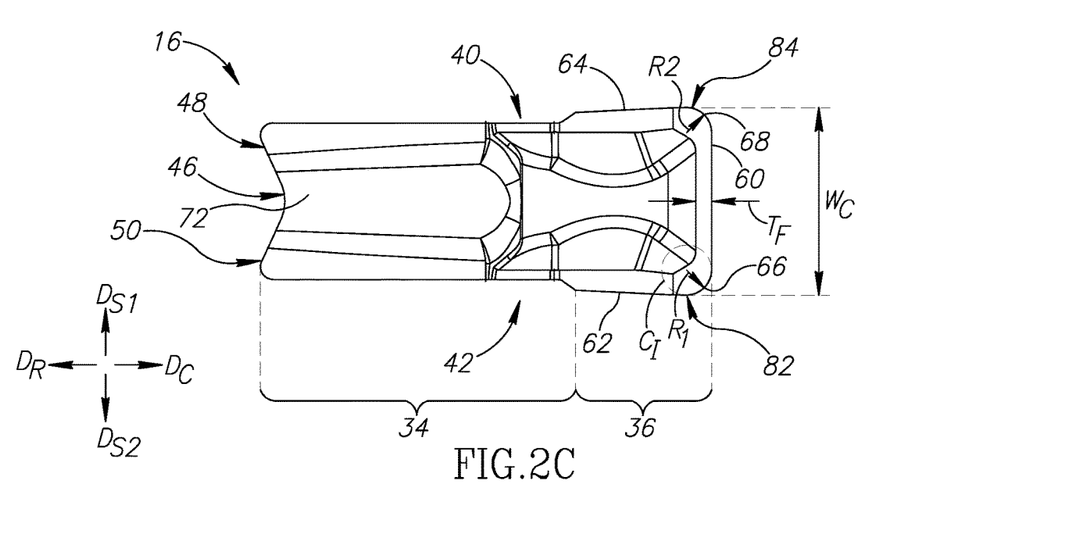
FIG. 2C is a top view (also called a plan view of the rake surface or a view in the downward direction towards the rake surface) of the cutting insert in FIG. 2A.
Figure 2D:
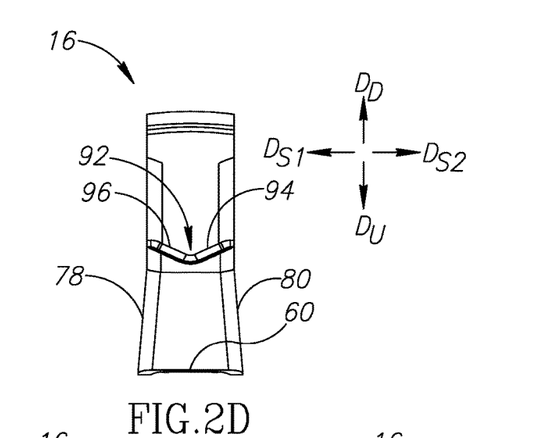
FIG. 2D is a front view of the cutting insert in FIG. 2A (also called a view of the front surface in the rearward direction)
Figures 2E, 2F:
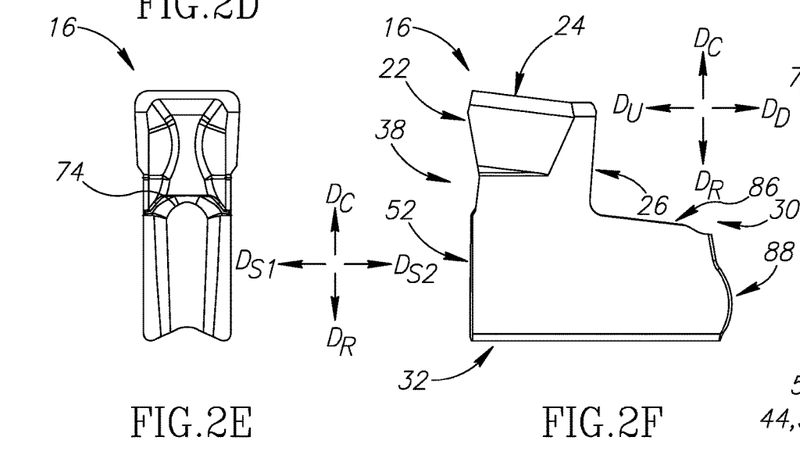
FIG. 2E is a top view of the cutting insert corresponding to the view in FIG. 2C.
FIG. 2F is a side view of the cutting insert in FIG. 2A.
Figure 2G:
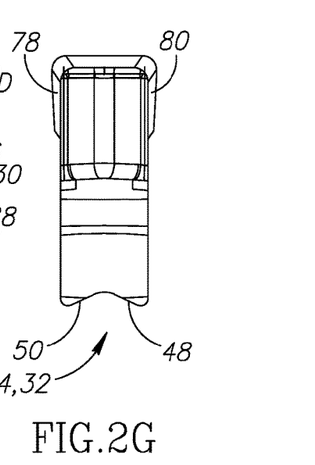
FIG. 2G is a bottom view of the cutting insert in FIG. 2A.
Figure 2H:
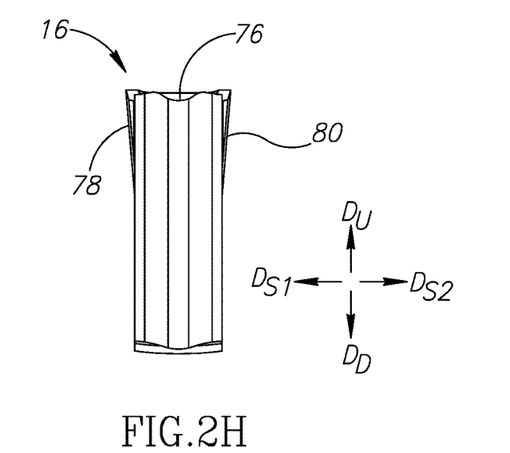
FIG. 2H is a rear view of the cutting insert in FIG. 2A.

As shown best in FIG. 2F, the front relief surface 24 extends downwardly and rearwardly from the rake surface 22.

The rear surface 32 comprises a rear lateral securing arrangement 44. More precisely, the rear lateral securing arrangement 44 comprises a rear groove 46 having opposing rear side groove surfaces 48, 50 extending inwardly and forwardly (see, e.g., FIG. 2C).

The upper surface 38 can be theoretically divided into the rake surface 22 at the cutting portion 36, and into a shank upper surface 52.

The rake surface 22 comprises a cutting edge 54, and a chip-former arrangement 56 having a single recess 58.

The cutting edge 54 comprises a front sub-edge 60, a first side sub-edge 62, a second side sub-edge 64, a first convex corner sub-edge 66 having a first radius $R_1$ and a second convex corner sub-edge 68 having a second radius $R_2$.

As exemplified in this non-limiting example, the front sub-edge 60 is straight in a plan view of the rake surface 22 (see FIG. 2C), extends perpendicular to the cutting direction (see FIG. 2C), is straight in a view of the front relief surface along the rearward direction (see FIG. 2D), and has a uniform thickness $T_F$ (see FIG. 2C). The thickness $T_F$ reinforces, and thereby strengthens, the front sub-edge 60, extending the life of the insert, even while cutting at higher-than-normal feed rates in the cutting direction $D_C$. Thus, the front sub-edge 60 may be considered in one sense to have a reinforced "land" provided with an enlarged thickness in a direction parallel to the cutting direction $D_C$.

For clarity only, arcuate extensions of each of the first and second convex corner sub-edges 66, 68 can form an imaginary circle $C_1$ (only one being shown in FIG. 2C) and the radius of the circle $C_1$ provides the values of the radii $R_1$, $R_2$.

As shown in more detail in FIG. 2C, the cutting width $W_C$ is defined from a first point 82 of the first convex corner sub-edge 66, to a second point 84 of the second convex corner sub-edge 68. Inserts in accordance with the subject matter of the present application have narrow-width front sub-edges 60. For present purposes, a "narrow-width" front sub-edge 60 is defined to be one that has a cutting width that is less than or equal to 6 mm. However, in some embodiments and for some applications, the cutting width of the front sub-edge 60 can be smaller, such as no greater than 4 mm or preferably 3 mm. While it is unknown what the lower limit of such narrow parting off insert could be in future, currently it is theorized that a smallest value cutting width that is practical is 2 mm or greater. The currently preferred range of values is 2.5 mm to 4.5 mm. Such optimal range being a compromise between a minimum insert size that can handle a substantial cutting force load and a desire for a cutting width to be as small as possible to reduce wasted material.

A top aspect ratio $R_T$ for the front sub-edge 60 is defined as the ratio of the cutting width $W_C$ to the thickness $T_F$, as seen in a top view of the insert (FIG. 2C); i.e., $R_T = W_C/T_F$.

An insert in accordance with the subject matter of the present application has a top aspect ratio less than 30; i.e., $R_T < 30$.

The shank upper surface 52 can comprise a coolant configuration 70. The coolant configuration 70 can comprise a coolant groove 72. The coolant groove 72 can open out to the rake surface 22 at a coolant rake opening 74. The coolant groove 72 can open out to the rear surface 32 at a coolant rear opening 76.

The first side surface 40 can comprise a first side relief surface 78 (FIG. 2A). The first side relief surface 78 can extend rearwardly and inwardly from the front relief surface 24 (FIG. 2G) and can extend downwardly and inwardly from the rake surface 22 (FIG. 2D).

The second side surface 42 can comprise a second side relief surface 80 (FIG. 2A). The second side relief surface 80 can extend rearwardly and inwardly from the front relief surface 24 (FIG. 2G) and can extend downwardly and inwardly from the rake surface 22 (FIG. 2D).

Referring to FIG. 2F, the support surface 30 can comprise a support surface seat portion 26, a support surface abutment portion 86 and a bottom surface portion 88.

The support surface seat portion 26 can be formed with a support lateral securing arrangement 90 (FIG. 2A). The support lateral securing arrangement 90 can comprise a support groove 92 and opposing support side groove surfaces extending inwardly and upwardly 94, 96.

The support surface abutment portion 86 provides a counter abutment surface to the rear surface 32. Preferably, the support surface abutment portion 86 is devoid of a lateral securing arrangement. It will be understood, however, that alternate locations for lateral securing arrangements are possibilities, albeit less preferred. As are the options to have projections instead of grooves.

Example parting-off test results of a parting-off insert according to the invention and a comparative insert only differing with respect to the minimum front sub-edge thickness $T_F$ and radii $R_1$, $R_2$ is detailed below.

In the parting-off test, both inserts were made of the same grade material, both had $W_C$=4 mm, and cutting speed $V_C$ was set to 100 m/min. Maximum wear was defined as 0.25 mm.

The feed rate F1 was set to normal conditions for the comparative insert (F1=0.18 mm/rev, which was slightly larger than the minimum front sub-edge thickness thereof, i.e. 0.115 mm, and so $R_T$=4 mm/0.115 mm=34.78). The feed rate F2 was set to what is expected to be normal conditions for the insert according to the invention (F2=0.4 mm/rev, which was slightly larger than the minimum front sub-edge thickness $T_F$ thereof, i.e. 0.3 mm, and so $R_T$=4 mm/0.3 mm=13.33).

The radii $R_1$, $R_2$ for the comparative insert was 0.24 mm. The radii $R_1$, $R_2$ for the insert according to the invention was 0.50 mm.

In the test, the two comparative inserts tested reached maximum wear after 20 and 25 minutes, respectively. The two inserts according to the present invention reached maximum wear after 100 and 110 minutes, respectively.

Accordingly, there was a tremendous unexpected improvement in tool life for the inserts according to the present invention, even though both inserts were tested under normal operating conditions.

In a grooving test of the same types of inserts described above, the cutting speed $V_C$ was set to 200 m/min and the feed for both was set at 0.4 mm/rev. In this test the insert according to the present invention performed three times as many grooves as the comparative insert.

What is claimed is:

1. A narrow-width parting-off insert comprising:
   a shank portion; and
   a cutting portion connected to the shank portion and defining a cutting direction from the shank portion towards the cutting portion, and a rearward direction opposite to the cutting direction, the cutting portion comprising:
   a rake surface;
   a support surface comprising at least a support surface seat portion located underneath the rake surface, a downward direction being defined as directed from the rake surface towards the support surface seat portion;
   a front relief surface connected to the rake surface and support surface and being the forwardmost surface of the cutting portion, the front relief surface extending downwardly from the rake surface;
   a first side relief surface connected to the front relief surface and the rake surface, the first side relief surface extending rearwardly from the front relief surface and extending downwardly from the rake surface;
   a second side relief surface connected to the front relief surface and the rake surface, the second side relief surface extending rearwardly from the front relief surface and extending downwardly from the rake surface; and
   a cutting edge comprising:
      a reinforced front sub-edge formed at an intersection of the rake surface and the front relief surface;
      a first side sub-edge formed at an intersection of the rake surface and the first side relief surface;
      a second side sub-edge formed at an intersection of the rake surface and the second side relief surface;
      a first convex corner sub-edge connecting the front sub-edge and the first side sub-edge and having a first radius R1; and
      a second convex corner sub-edge connecting the front sub-edge and the second side sub-edge and having a second radius R2;
   wherein:
      the rake surface comprises a chip-former arrangement located rearward of the front sub-edge and extending downwardly or downwardly and rearwardly from the front sub-edge;
      a cutting width WC is defined from a first point of the first convex corner sub-edge which is distal to the second convex corner sub-edge, to a second point of the second convex corner sub-edge which is distal to the first convex corner sub-edge;
      a minimum front sub-edge thickness TF is defined from a forwardmost point of the front sub-edge to a closest point of an intersection of the front sub-edge and the chip-former arrangement;
      a top aspect ratio of the front sub-edge, RT=WC/TF, is less than 30;
      the cutting width WC fulfills the condition WC≤6 mm; and
      the minimum front sub-edge thickness TF fulfills the condition: TF>0.20 mm.

2. The parting-off insert according to claim 1, wherein the cutting width WC fulfills the condition: 2.5 mm≤WC≤4 mm.

3. The parting-off insert according to claim 1, wherein the minimum front sub-edge thickness TF fulfills the condition: TF>0.25 mm.

4. The parting-off insert according to claim 1, wherein the support surface seat portion extends parallel to the rake surface.

5. The parting-off insert according to claim 1, wherein the front relief surface extends downwardly and rearwardly from the rake surface; the first side relief surface extends rearwardly and inwardly from the front relief surface; and the second side relief surface extends rearwardly and inwardly from the front relief surface.

6. The parting-off insert according to claim 1, wherein the front sub-edge is straight in a plan view of the rake surface.

7. The parting-off insert according to claim 6, wherein the front sub-edge has a uniform thickness.

8. The parting-off insert according to claim 1, wherein the front sub-edge has a uniform thickness.

9. The parting-off insert according to claim 1, wherein the first radius R1 fulfills the condition: R1>0.20 mm; and the second radius R2 fulfills the condition: R2>0.20 mm.

10. The parting-off insert according to claim 9, wherein the first radius R1 fulfills the condition: R1>0.30 mm; and the second radius R2 fulfills the condition: R2>0.30 mm.

11. The parting-off insert according to claim 9, wherein the first radius R1 fulfills the condition: R1<0.60 mm; and the second radius R2 fulfills the condition: R2<0.60 mm.

12. The parting-off insert according to claim 11, wherein the first radius R1 fulfills the condition: R1<0.45 mm; and the second radius R2 fulfills the condition: R2<0.45 mm.

13. The parting-off insert according to claim 1, wherein the insert only comprises a single cutting edge.

14. The parting-off insert according to claim 1, wherein, in a plan view of the rake surface, the cutting width WC at the cutting edge is the largest dimension of the insert perpendicular to the cutting direction.

15. The parting-off insert according to claim 1, wherein the chip-former arrangement comprises only a single recess.

16. The parting-off insert according to claim 1, wherein, in a plan view of the rake surface, at an upper surface of the shank portion a coolant groove is formed and extends towards the rake surface.

17. The parting-off insert according to claim 1, wherein the support surface is formed with a support lateral securing arrangement.

18. The parting-off insert according to claim 17, wherein the support lateral securing arrangement is located on the support surface seat portion.

19. The parting-off insert according to claim 1, wherein a rear surface of the insert comprises a rear lateral securing arrangement.

20. The parting-off insert according to claim 1, wherein the support surface comprises a support surface abutment portion extending downward from the support surface seat portion.

21. The parting-off insert according to claim 20, wherein the support surface abutment portion extends downward and rearward.

22. The parting-off insert according to claim 20, wherein the support surface abutment portion is devoid of a lateral securing arrangement.

23. The parting-off insert according to claim 20, wherein the support surface comprises a bottom surface portion extending rearward from a support surface abutment portion to a rear surface of the insert.

24. The parting-off insert according to claim 1, wherein the only surfaces of the insert which have a lateral securing arrangement are the support surface seat portion and a rear surface.

25. The parting-off insert according to claim 1, wherein the insert has a solid construction.

26. The parting-off insert according to claim 1, wherein rearward of a connection area of the shank and cutting portion, the shank portion further extends downwardly or downwardly and rearwardly.

27. The parting-off insert according to claim 1, wherein:
the first radius R1 fulfills the condition: 0.60 mm>R1>0.30 mm;
the second radius R2 fulfills the condition: 0.60 mm>R2>0.30 mm;
the cutting width WC fulfills the condition WC≤5 mm;
the minimum front sub-edge thickness TF fulfills the condition: TF>0.25 mm;
a top aspect ratio of the front sub-edge, RT=WC/TF, is less than 20.

* * * * *